United States Patent [19]

Hofmann et al.

[11] Patent Number: 4,613,239

[45] Date of Patent: Sep. 23, 1986

[54] SOLID WINDOW CAGE FOR CYLINDRICAL ROLLER BEARING

[75] Inventors: Heinrich Hofmann; Günther Heurich, both of Schweinfurt, Fed. Rep. of Germany

[73] Assignee: FAG Kugelfischer Georg Schafer (KGaA), Fed. Rep. of Germany

[21] Appl. No.: 622,110

[22] Filed: Jun. 19, 1984

[30] Foreign Application Priority Data

Jul. 30, 1983 [DE] Fed. Rep. of Germany ....... 3327623

[51] Int. Cl.4 ............................................. F16C 33/46
[52] U.S. Cl. .................................................... 384/580
[58] Field of Search ............... 384/580, 576, 575, 572, 384/533

[56] References Cited

U.S. PATENT DOCUMENTS

| | | | |
|---|---|---|---|
| 1,940,124 | 12/1933 | Gibbons | 384/580 |
| 2,015,229 | 9/1935 | Lothrop | 384/575 |
| 3,586,406 | 6/1971 | Barr | 384/580 |
| 3,827,771 | 8/1974 | Fernlund . | |
| 3,940,193 | 2/1976 | Molloy | 384/580 |

FOREIGN PATENT DOCUMENTS

| | | |
|---|---|---|
| 296217 | 8/1928 | Fed. Rep. of Germany . |
| 7237598 | 6/1957 | Fed. Rep. of Germany . |
| 1010336 | 6/1957 | Fed. Rep. of Germany . |

Primary Examiner—Lenard A. Footland
Attorney, Agent, or Firm—Ostrolenk, Faber, Gerb & Soffen

[57] ABSTRACT

A solid window cage for a cylindrical roller bearing is provided. The pockets for the cylindrical rollers are defined between two axially spaced end rings and by circumferentially spaced apart webs which join the end rings. On each web facing into each pocket, a respective roller holding ledge is developed. The ledge extends in the circumferential direction of the cage into the respective pocket for preventing the roller from falling radially from the pocket. The ledge has an axially central section which projects in the circumferential direction of the cage further into the pocket, and the sides of the ledge adjacent the central section gradually decrease in height in the circumferential direction of the cage toward the end rings, giving the ledge an either dome or trapezoidal shape. The cage has undercuts extending radially through the cage at the transitions between the end rings and the webs.

7 Claims, 3 Drawing Figures

SOLID WINDOW CAGE FOR CYLINDRICAL ROLLER BEARING

BACKGROUND OF THE INVENTION

The invention relates to a solid window cage for a cylindrical roller bearing, which cage is guided on the rollers, and more particularly relates to the pockets of the cage.

Cages of this type fabricated of plastic have been used for several years to an incrementing extent. These cages have holding projections or ledges in the flat surfaces of the roller pockets for preventing the rollers from falling out of the pockets after the rollers have been loaded in the cage pockets and before the loaded cage has been installed in the bearing. The holding projections extend either over the entire axial length of the web of the pockets or else the projections are provided only in the axially central region of the webs. In the former case, the snapping of the rollers into place in the cage is generally difficult since relatively stiff projections must be deformed elastically over their entire length axially of the webs when the rollers are snapped into place. During this assembly step, cracks may be produced in the cage, particularly in the corners between the webs and the circumferential end rings of the cage, because of the high stress. These cracks lead rather rapidly to the failure of the cage and thus of the bearing. Similar problems may be experienced with the latter embodiment referred to above. Although the rollers can be snapped somewhat more easily into position, this can also have the result that the rollers may drop out again. To counteract this, the holding noses on the projections must be of a certain height in the circumferential direction of the cage. For this reason, however, the cage is again subjected to stronger stresses upon the snapping into place of the rollers. Since corners with notch properties are present both at the transition places between the holding projections and the webs and at the transition places between the webs and the end rings, the cage may then be damaged at these places. The above difficulties in snapping rollers into place occur twofold in the case of cages whose pockets are produced by onepiece radial slides, and this increases the risk of cage cracking.

SUMMARY OF THE INVENTION

The object of the present invention is, therefore, to improve the aforementioned type of cage, so that, despite extensive encirclement of the rollers by the holding projections or ledges in the cage pockets, the webs of the cage do not break.

According to the invention, a cylindrical roller bearing, which includes cylindrically shaped rollers held in the pockets of an annular window or pocket cage, has its cage developed to prevent the rollers from falling radially inward, out of the cage. The cage is a single piece solid window cage, and may be comprised of a typical plastic material which is now being used for bearing cages. The cage includes a pair of axially spaced apart annular end rings and a plurality of circumferentially spaced apart webs which extend axially between and join the end rings. A respective pocket for a roller is defined between the end rings and two adjacent webs. Except for the below-described holding projections or ledges, the transversely extending sides of the pockets defined on the webs do not project circumferentially.

The invention comprises at least one and preferably both of the webs that define a cage pocket having a respective circumferentially projecting holding projection or ledge defined on the circumferential side of the web facing into the pocket. The holding ledge on the web in the pocket or both of the holding ledges at both webs in the pocket are not of flat height in the circumferential direction of the cage across the web. Instead, the axially central portion of the holding ledge projects into the pocket sufficiently to hold the roller against falling out of the pocket. This central section may be flat across the cage for a short distance. From its projecting central portion, the axially adjacent sides of the holding ledge gradually taper shorter in height measured circumferentially of the cage toward the two end rings. As a result, as seen in a radially directed top or plan view, each holding ledge is domed and in a preferred embodiment each ledge has an approximately trapezoidal shape, with the decreasing height sides extending from the flat central section to the end rings. The axially central section has a wide, flat surface, which is advantageous upon the mounting of the rollers in the cage.

The holding ledges are preferably disposed toward the radially inward side of the webs, so as to be radially beneath the respective rollers supported by the ledges.

To further prevent cracking of the cage, at the transition regions between the axially extending webs and the circumferentially extending end rings in each of the pockets, there is provided in each of the end rings an undercut which extends radially through the entire thickness of the cage.

Shaping the holding ledges as described prevents the occurrence of edges having sharp corners at which impermissibly high stresses can be produced upon the snapping into place of the rollers or upon the pulling out of the radial slides. The transitions are instead smooth. This even makes it possible to increase the height of the holding ledges circumferentially of the cage, which is very desirable in the case of cages which are guided on the rollers. In this way, the rollers are gripped around over a larger area so that the holding properties are improved, without the snapping of the rollers into position being thereby made difficult. Furthermore, due to the sections of the projections next to the central section which decrease toward the end rings, the rollers can be held in better paraxial position. As a result, the supplementing of the bearing, for instance by the bearing ring which is still lacking, is facilitated, since so-called sagging of the rollers is reduced.

To avoid any notch effect at the transitions between the webs and the end rings, an undercut in the end ring and opening into the adjacent pocket is provided at each of these transitions. In this way, furthermore, the elasticity of the webs is additionally increased without the strength of the cage thereby suffering.

The invention provides cages whose manufacture and assembly is facilitated and whose functionality is increased. Cage breakages are avoided even upon the occurrence of oscillations, for instance in the event of high speeds of rotation of the bearing.

Federal Republic of Germany Utility Model DE-Gbm No. 72 37 598 shows a cage with webs which have a similar shape as seen in radial top view. But the invention and this known embodiment are not comparable. With the present invention, an entirely different problem is to be solved and the solution is not the same. No holding ledges, namely, are provided in the pockets, and the webs decrease over their entire thickness from the center toward the two end rings.

Other objects and features of the invention are explained with reference to the accompanying drawings.

DESCRIPTION OF THE PREFERRED EMBODIMENTS

Figure 1:
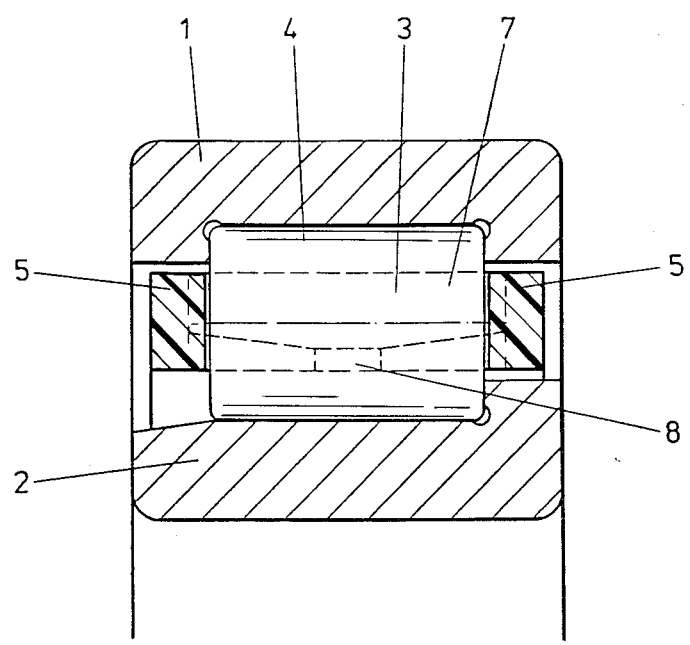
FIG. 1 is a partial transverse sectional view along the axis and through a cylindrical roller bearing having a cage in accordance with the invention.

Referring to FIG. 1, the cylindrical roller bearing shown comprises the radially outer ring 1, the radially inner ring 2, the window cage 3 having a plurality of roller pockets formed in it and a corresponding plurality of rollers 4 in the pockets. The cage 3 comprises the two axially spaced apart end rings 5 and the circumferentially spaced webs 6 which join the end rings. In their respective radially outer regions, the webs 6 have respective flat sections 7 in which the parallel guidance of the rollers 4 takes place.

Figure 3:
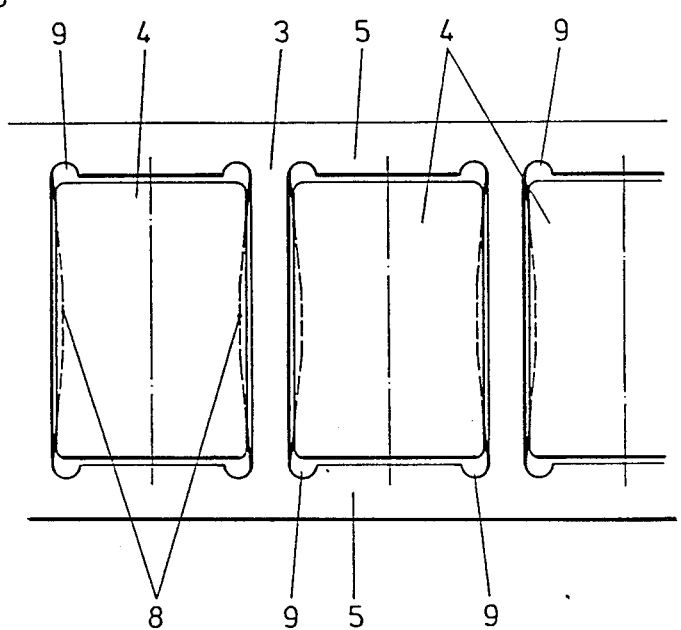
FIG. 3 is a radial top view of a portion of the cage of the bearing of FIGS. 1 and 2.

In order to prevent the rollers from falling out radially toward the inside of the cage 3, holding projections or ledges 8 are provided on both circumferential sides of all webs 6 facing circumferentially toward each other at the sides of the pockets. The ledges have a circumferentially greater height axially center portion and have sections at the sides of the center portion which become progressively circumferentially smaller in the direction toward the end rings 5, giving each ledge a generally trapezoidal shape, as shown in top view in FIG. 3. In FIG. 3, a more domed shape, which is upraised circumferentially from the webs, is shown for the ledges 8.

Figure 2:
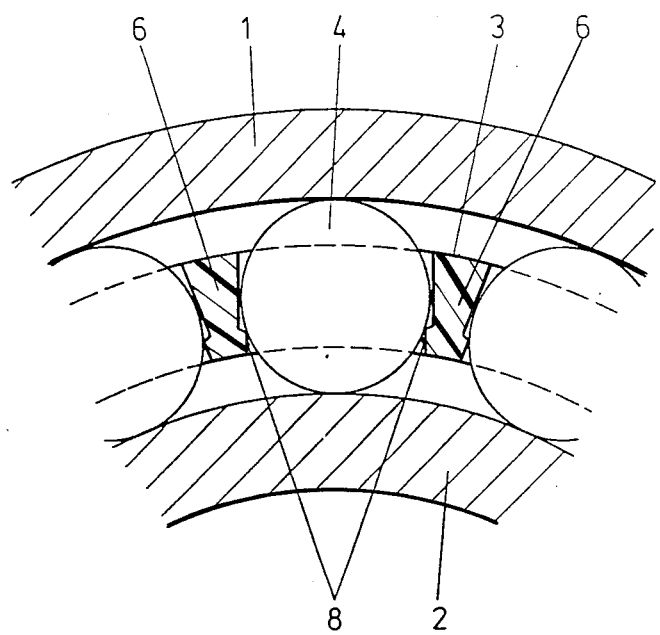
FIG. 2 is a partial elevational sectional view through a bearing according to FIG. 1.

As can be seen in FIG. 2, the ledges 8 are placed on the webs 6 toward the radially inward sides of the webs. The rollers 4 can then no longer fall radially inward since the space between the holding ledges 8 within a pocket is less than the diameter of the roller.

In order for the notch effect to be reduced at the places of transition between the webs 6 and the end rings 5, undercuts 9 are provided extending axially into the rings of the cage at the transitions and extending radially through the entire cage and opening into the respective cage pockets.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A window cage for a roller bearing, the cage comprising:
a pair of axially spaced apart end rings and a plurality of axially extending webs at circumferentially spaced apart locations around the end rings and joining the end rings for defining the cage; two adjacent ones of the circumferentially spaced apart webs together with the end rings define a pocket each for receiving a respective bearing roller; the webs adjacent a pocket each having a respective surface facing into and defining that pocket;

on at least one of the web surfaces defining a pocket, a holding ledge for the roller for that pocket being provided; the holding ledge having an axially generally central section which projects circumferentially of the cage further into the pocket for defining means for preventing the roller from moving radially out of the pocket past the ledge; the ledge gradually decreasing in height, measured circumferentially of the cage, at the axial sides of the central section toward both of the end rings; the ledge at both axial sides of the generally central section thereof gradually decreasing in height from the central section to respective locations substantially at the end rings, wherein the webs meet the end rings at respective transitions; and at the transitions of each of the webs with the end rings and opening into the pockets, each of the end rings having a respective undercut extending axially into the end ring and extending radially over the entire thickness of the cage.

2. The cage of claim 1, wherein the holding ledge is generally dome-shaped.

3. The cage of claim 1, wherein the generally central section of the ledge is flat and parallel to the axis of the cage and the axial sides of the ledge at both axial sides of the central are also flat and decreasing in circumferential height to merge with the respective web surface on which the ledge is provided, giving the ledge an approximately trapezoidal shape.

4. The cage of claim 1, wherein the web has a radially more outward and radially more inward side and the ledge is defined toward the radially more inward side of the web for preventing the rollers from falling radially inwardly out of the cage.

5. The cage of claim 1, wherein there is a respective holding ledge on each of the web surfaces facing inward toward and defining the cage pocket in the cage.

6. A roller bearing, comprising:
the cage of claim 1;
a plurality of rollers, with each of the rollers being disposed in a respective pocket of the cage;
an outer ring and an inner ring, and the cage and rollers being disposed between the outer and inner rings; the outer and inner rings respectively defining outer and inner faces which are so spaced apart and the rollers being of such cross-section that the rollers in the cage and between the outer and inner rings rollingly ride in the pockets and over the respective outer and inner races.

7. The bearing of claim 6, wherein the bearing is a cylindrical roller bearing and the rollers are cylinders.

* * * * *